US012807827B2

(12) United States Patent
Li et al.

(10) Patent No.: US 12,807,827 B2
(45) Date of Patent: Nov. 24, 2026

(54) PHOTOCURABLE COMPOSITION

(71) Applicant: CANON KABUSHIKI KAISHA, Tokyo (JP)

(72) Inventors: Fei Li, Austin, TX (US); Fen Wan, Austin, TX (US); Timothy Brian Stachowiak, Austin, TX (US); Weijun Liu, Cedar Park, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 937 days.

(21) Appl. No.: 17/818,561

(22) Filed: Aug. 9, 2022

(65) Prior Publication Data

US 2024/0052183 A1 Feb. 15, 2024

(51) Int. Cl.

*C09D 11/101* (2014.01)
*B41M 5/00* (2006.01)
*C09D 11/107* (2014.01)
*C09D 11/30* (2014.01)

(52) U.S. Cl.

CPC ......... *C09D 11/101* (2013.01); *B41M 5/0023* (2013.01); *C09D 11/107* (2013.01); *C09D 11/30* (2013.01)

(58) Field of Classification Search

CPC ..... C09D 11/101; C09D 11/107; C09D 11/30; C09D 11/38; B41M 5/0023; C08F 222/1025; C08F 2/50; C08F 220/12; G03F 7/028

See application file for complete search history.

(56) References Cited

U.S. PATENT DOCUMENTS

| | | | | |
|---|---|---|---|---|
| 9,376,581 | B2 | 6/2016 | Kitagawa et al. | |
| 9,868,846 | B2 | 1/2018 | Kodama et al. | |
| 11,168,200 | B2 | 11/2021 | Hu | |
| 11,261,267 | B1 | 3/2022 | Li et al. | |
| 2010/0009138 | A1 | 1/2010 | Kodama et al. | |
| 2012/0231234 | A1* | 9/2012 | Kodama | C08J 3/28 522/108 |
| 2015/0166704 | A1* | 6/2015 | Otani | C08F 222/102 522/18 |
| 2015/0344711 | A1* | 12/2015 | Shimono | C09D 11/322 526/278 |
| 2017/0351172 | A1 | 12/2017 | Yonezawa et al. | |
| 2018/0079921 | A1* | 3/2018 | Okamoto | C09D 11/328 |
| 2018/0120698 | A1* | 5/2018 | Kitagawa | H01L 23/31 |
| 2019/0144697 | A1* | 5/2019 | Saito | C08F 2/46 106/31.78 |
| 2020/0201178 | A1 | 6/2020 | Wan et al. | |
| 2020/0339828 | A1* | 10/2020 | Li | C09D 11/101 |
| 2023/0049921 | A1* | 2/2023 | Toyoshima | C08G 77/20 |

FOREIGN PATENT DOCUMENTS

| | | | | |
|---|---|---|---|---|
| CN | 105733361 A | | 7/2016 | |
| JP | 2011021113 A | * | 2/2011 | |
| TW | 201723650 A | | 7/2017 | |
| TW | 202024157 A | | 7/2020 | |
| WO | WO-2016104670 A1 | * | 6/2016 | C08F 220/22 |

OTHER PUBLICATIONS

"Dicyclopentenyl Acrylate." ChemBK, www.chembk.com/en/chem/DICYCLOPENTENYL%20ACRYLATE. (Year: 2025).*
"Bisphenol A Dimethacrylate." PubChem, U.S. National Library of Medicine, pubchem.ncbi.nlm.nih.gov/compound/Bisphenol-A-dimethacrylate. (Year: 2025).*
"Benzyl Acrylate." ChemSpider, www.chemspider.com/Chemical-Structure.13846811.html (Year: 2025).*
English machine translation of JP-2011021113-A (Year: 2011).*
English machine translation of WO-2016104670-A1 (Year: 2016).*

* cited by examiner

*Primary Examiner* — Amber R Orlando
*Assistant Examiner* — Jeffrey Eugene Barzach
(74) *Attorney, Agent, or Firm* — Abel Schillinger, LLP

(57) ABSTRACT

A photocurable composition can comprise a polymerizable material and a photoinitiator, wherein the polymerizable material can comprise at least one multi-functional acrylate monomer in an amount of at least 75 wt % based on the total weight of the polymerizable material and at least one mono-functional monomer in an amount of at least 5 wt % based on the total weight of the polymerizable material. The at least one mono-functional monomer can have a ring parameter of at least 0.5, and a total carbon content of the photocurable composition after curing may be at least 69%. The photocurable composition may have a low thermal shrinkage after curing, a high etch resistance and be suitable for AIP or NIL processing.

15 Claims, No Drawings

PHOTOCURABLE COMPOSITION

FIELD OF THE DISCLOSURE

The present disclosure relates to a photocurable composition, particularly to a photo-curable composition for inkjet adaptive planarization adapted for forming photo-cured layers having a low thermal shrinkage and high etch resistance.

BACKGROUND

Inkjet Adaptive Planarization (IAP) is a process which planarizes a surface of a substrate, e.g., a wafer containing an electric circuit, by jetting liquid drops of a photocurable composition on the surface of the substrate, and bringing a flat superstrate in direct contact with the added liquid to form a flat liquid layer. The flat liquid layer is typically solidified under UV light exposure, and after removal of the superstrate a planar polymeric surface is obtained, which can be subjected to subsequent processing steps, for example baking, etching, and/or further deposition steps.

There exists a need for improved IAP materials leading to planar photo-cured layers with a high etch resistance, high thermal stability, and low shrinkage during subsequent processing.

SUMMARY

In one embodiment, a photocurable composition can comprise a polymerizable material and a photoinitiator, wherein the polymerizable material comprises at least one multi-functional acrylate monomer in an amount of at least 75 wt % based on the total weight of the polymerizable material and at least one mono-functional monomer in an amount of at least 5 wt % based on the total weight of the polymerizable material, the at least one mono-functional monomer having a ring parameter of at least 0.5; and a total carbon content of the photocurable composition after curing is at least 69%.

In one aspect of the photocurable composition, the amount of multi-functional acrylate monomer can be at least 85 wt % based on the total weight of the polymerizable material.

In another aspect, the amount of the polymerizable material of the photocurable composition can be at least 90 wt % based on the total weight of the photocurable composition.

In a further aspect, the photocurable composition can be adapted that a photo-cured layer formed from the photocurable composition has a thermal shrinkage after a baking treatment at 250° C. of not greater than 5.0%, the baking treatment including 2 minutes baking of the photo-cured layer on a stainless-steel plate having a temperature of 250° C. under $N_2$ environment.

In one aspect, the photocurable composition can have a viscosity of not greater than 25 mPa·s at a temperature of 23° C. In a particular aspect, the viscosity of the photocurable composition may be not greater than 15 mPa·s at a temperature of 23° C.

In one embodiment, the multi-functional acrylate monomer can be an aromatic di-functional acrylate monomer. In a certain aspect, the di-functional acrylate monomer can include m-xylylene diacrylate (MXDA), bisphenol A dimethacrylate (BPADMA), or a combination thereof.

In another embodiment, the amount of the mono-functional monomer can be at least 5 wt % and not greater than 15 wt % based on the total weight of the polymerizable material.

In one aspect, the mono-functional monomer of the polymerizable material can include an acrylate monomer comprising an aromatic ring structure.

In particular aspects, the mono-functional monomer can include 2-propenoic acid, 3,3-diphenylpropyl ester (DPHPA), m-phenoxybenzyl acrylate (POBA), (2-benzylphenyl) 2-methylprop-2-enoate (2-BzPA), dicyclopentenyl acrylate (DCPA), 1-naphthyl acrylate (1-NA), or any combination thereof.

In one embodiment of the photocurable composition, the polymerizable material can consist essentially of the multi-functional acrylate monomer and the mono-functional monomer.

In one aspect, the multi-functional acrylate monomer can be a di-functional acrylate monomer in an amount of at least 85 wt % based on the total weight of the polymerizable monomer, and the mono-functional monomer can be an aromatic acrylate monomer in an amount of at least 5 wt % based on the total weight of the polymerizable monomer.

In another embodiment, a laminate can comprise a substrate and a photo-cured layer, wherein the photo-cured layer may be formed with the above-described photocurable composition.

In one aspect of the laminate, the photo-cured layer can have a thermal shrinkage after a baking treatment at 250° C. of not greater than 5.0%, the baking treatment including 2 minutes baking of the photo-cured layer on a stainless-steel plate having a temperature of 250° C. under $N_2$ environment.

In one embodiment, a method of forming a photo-cured layer on a substrate can comprise: applying a layer of a photocurable composition on the substrate, wherein the photocurable composition can comprise a polymerizable material and at least one photoinitiator, the polymerizable material comprising at least one multi-functional monomer in an amount of at least 75 wt % based on the total weight of the polymerizable material and at least one mono-functional monomer in an amount of at least 5 wt % based on the total weight of the polymerizable material, the mono-functional monomer having a ring parameter of at least 0.5; bringing the photocurable composition into contact with a template or a superstrate; irradiating the photocurable composition with light to form a photo-cured layer; and removing the template or the superstrate from the photo-cured layer, wherein a total carbon content of the photo-cured layer can be at least 69%.

In one aspect of the method, the photo-cured can have a thermal shrinkage after a baking treatment at 250° C. of not greater than 5.0%, the baking treatment including 2 minutes baking of the photo-cured layer on a stainless steel plate having a temperature of 250° C. under $N_2$ environment.

In another aspect of the method, the photocurable composition can have a viscosity of not greater than 25 mPa·s.

In a certain aspect of the method, the polymerizable material of the photocurable composition can consist essentially of the multi-functional acrylate monomer and the mono-functional monomer.

In another embodiment, a method of manufacturing an article can comprise: applying a layer of a photocurable composition on the substrate, wherein the photocurable composition may comprise a polymerizable material and at least one photoinitiator, the polymerizable material comprising at least one multi-functional acrylate monomer in an amount of at least 75 wt % based on the total weight of the polymerizable material and at least one mono-functional monomer in an amount of at least 5 wt % base on the total weight of the polymerizable material, the mono-functional monomer having a ring parameter of at least 0.5; bringing the photocurable composition into contact with a template or a superstrate; irradiating the photocurable composition with light to form a photo-cured layer; removing the template or the superstrate from the photo-cured layer; forming a pattern on the substrate; processing the substrate on which the pattern has been formed in the forming; and manufacturing an article from the substrate processed in the processing, wherein a total carbon content of the photo-cured layer can be at least 69%.

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms “comprises,” “comprising,” “includes,” “including,” “has,” “having” or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, “or” refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of “a” or “an” are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a photocurable composition comprising a polymerizable material and a photoinitiator, wherein the polymerizable material can comprise at least one multi-functional acrylate monomer in an amount of at least 75 wt % based on the total weight of the polymerizable material and at least one mono-functional monomer in an amount of at least 5 wt % based on the total weight of the polymerizable material. The at least one mono-functional monomer may have a ring parameter of at least 0.5, and the total carbon content of the photocurable composition after curing can be at least 69%.

It has been surprisingly observed that photocurable compositions comprising certain combinations of at least one multi-functional acrylate monomer and at least one mono-functional monomer having a ring parameter of at least 0.5 can allow the forming of photo-cured layers having a high thermal stability and a high etch resistance. Not being bound to theory, it is assumed that the right balance of the type and amount of multi-functional acrylate monomer and the type and amount of mono-functional monomer can facilitate in the forming of highly suitable resist materials for NIL or IAP processing, having a low viscosity, high carbon content, high thermal stability, and high etch resistance.

As used herein, the term “ring parameter” expresses a calculated quotient of the mass of the carbon atoms contained in the aromatic ring(s) of the mono-functional monomer (dividend) divided by the total mass of carbon atoms of the mono-functional monomer (divisor).

In certain aspects, the ring parameter can be at least 0.51, or at least 0.52, or at least 0.53, or at least 0.54, or at least 0.55, or at least 0.56, or at least 0.57, or at least 0.58, or at least 0.59, or at least 0.60.

In one embodiment, the mono-functional monomer can include an acrylate monomer comprising an aromatic ring structure.

In particular aspects, the mono-functional monomer can be 2-propenoic acid, 3,3-diphenylpropyl ester (DPHPA), m-phenoxybenzyl acrylate (POBA), (2-benzylphenyl) 2-methylprop-2-enoate (2-BzPA), dicyclopentenyl acrylate (DCPA), 1-naphthyl acrylate (1-NA), or any combination thereof.

In a further aspect, the amount of the mono-functional monomer can be at least 5 wt % based on the total weight of the polymerizable material, such as at least 7 wt %, or at least 10 wt %, or at least 12 wt %. In another aspect, the amount of the mono-functional monomer may be not greater than 15 wt % based on the total weight of the polymerizable material, or not greater than 12 wt %, or not greater than 10 wt %.

The multi-functional acrylate monomer of the polymerizable material can be di-functional, tri-functional, or tetra-functional in non-limiting embodiments. In a certain aspect, the multi-functional acrylate monomer can include an aromatic ring structure. In a particular aspect, the multi-functional acrylate monomer can be a di-functional acrylate monomer including an aromatic ring structure.

Non-limiting examples of multi-functional acrylate monomers can be m-xylylene diacrylate (MXDA), bisphenol A dimethacrylate (BPADMA), or a combination thereof.

The photocurable compositions can be designed of having a low viscosity before curing. In one embodiment, the viscosity of the photocurable composition can be not greater than 30 mPa·s, or not greater than 25 mPa·s, or not greater than 20 mPa·s, or not greater than 15 mPa·s, or not greater than 10 mPa·s. In other certain embodiments, the viscosity may be at least 5 mPa·s, such as at least 8 mPa·s, or at least 10 mPa·s. In a particularly preferred aspect, the photocurable composition can have a viscosity from 7 mPa·s to not greater than 15 mPa·s. As used herein, all viscosity values relate to viscosities measured at a temperature of 23° C. with the Brookfield method using a Brookfield Viscometer.

As used herein the term acrylate monomer relates to both unsubstituted and alkyl-substituted acrylates, for example, methacrylate.

In another aspect, the amount of the multi-functional acrylate monomer can be at least 75 wt %, or at least 80 wt %, or at least 85 wt %, or at least 90 wt % based on the total weight of the polymerizable material. In another aspect, the amount of the multi-functional monomer may be not greater than 95 wt % based on the total weight of the polymerizable material, or not greater than 92 wt %, or not greater than 90 wt %, or not greater than 85 wt %.

The amount of polymerizable material in the photocurable composition can be at least 50 wt %, or at least 60 wt %, or at least 70 wt %, or at least 80 wt %, or at least 85 wt %, or at 90 wt %, or at least 95 wt %. In another aspect, the amount of polymerizable material may be not greater than 98 wt %, such as not greater than 95 wt %, or not greater than 90 wt %, or not greater than 80 wt %, or not greater than 70 wt %. The amount of the polymerizable material can be a value between any of the minimum and maximum values noted above. In a particular aspect, the amount of the polymerizable material can be at least 70 wt % and not greater than 98 wt %.

The photocurable composition of the present disclosure can be adapted that a photo-cured layer formed from the photocurable composition may have a high thermal stability. In one aspect, a photo-cured layer formed from the photocurable composition can have a thermal shrinkage after a baking treatment at 250° C. of not greater than 5.0%, the baking treatment including 2 minutes baking of the photo-cured layer on a stainless-steel plate having a temperature of 250° C. under $N_2$ environment. In further aspects, the thermal shrinkage after the baking treatment at 350° C. may be not greater than 4.5%, not greater than 4.0%, not greater than 3.5%, not greater than 3.0%, or not greater than 2.5%, or not greater than 2.0%. As used herein, the thermal shrinkage (St) relates to a linear shrinkage of the photo-cured layer after being submitted to the baking treatment, and is calculated according to the equation: $St=(T_u-T_b)/T_u$, with $T_u$ being the thickness of the photo-cured film before the baking, $T_b$ being the thickness of the film after baking.

In one embodiment, the photocurable composition of the present disclosure can be essentially free of a solvent. As used herein, if not indicated otherwise, the term solvent relates to a compound which can dissolve or disperse the polymerizable monomers but does not itself polymerize during the photo-curing of the photocurable composition. The term "essentially free of a solvent" means herein an amount of solvent being not greater than 5 wt % based on the total weight of the photocurable composition. In a certain particular aspect, the amount of the solvent can be not greater than 3 wt %, not greater than 2 wt %, not greater than 1 wt % based on the total weight or the photocurable composition, or the photocurable composition can be free of a solvent, except for unavoidable impurities.

In another particular aspect, the photocurable composition can include a solvent in an amount of at least 6 wt % based on the total weight of the photocurable composition, or at least 8 wt %, at least 10 wt %, at least 15 wt %, or at least 20 wt %, or at least 30 wt %. In another aspect the amount of solvent may be not greater than 40 wt %, or not greater than 30 wt %, or not greater than 20 wt %, or not greater than 15 wt %, or not greater than 10 wt % based on the total weight of the photocurable composition.

In order to initiate the photo-curing of the composition if exposed to light, one or more photoinitiators can be included in the photocurable composition. In a certain aspect, the curing can be also conducted by a combination of light and heat curing.

The photocurable composition can further contain one or more optional additives. Non-limiting examples of optional additives can be stabilizers, dispersants, solvents, surfactants, inhibitors, or any combination thereof.

The photocurable composition of the present disclosure can be adapted for use in inkjet adaptive planarization (IAP) or in nanoimprint lithography (NIL).

In one embodiment, the photocurable composition can be applied on a substrate to form a photo-cured layer. As used herein, the combination of substrate and photo-cured layer overlying the substrate is called a laminate.

The inclusion of the at least one reactive polymer of the polymerizable material can contribute to a high carbon content of the photocurable composition and in the formed photo-cured layer. In one embodiment, the photocurable composition can be adapted that a carbon content after curing may be at least 69%.

The present disclosure is further directed to a method of forming a photo-cured layer. The method can comprise applying a layer of the photocurable composition described above over a substrate, bringing the photocurable composition into contact with a template or superstrate; irradiating the photocurable composition with light to form a photo-cured layer; and removing the template or the superstrate from the photo-cured layer.

The substrate and the solidified layer may be subjected to additional processing, for example, an etching process, to transfer an image into the substrate that corresponds to the pattern in one or both of the solidified layer and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like.

The photo-cured layer may be further used as an interlayer insulating film of a semiconductor device, such as LSI, system LSI, DRAM, SDRAM, RDRAM, or D-RDRAM, or as a resist film used in a semiconductor manufacturing process.

EXAMPLES

The following non-limiting examples illustrate the concepts as described herein.

Example 1

Photocurable Compositions.

Photocurable compositions were prepared including as di-functional acrylate monomer m-xylylene diacrylate (MXDA) in varying concentrations, together with one of the following mono-functional monomers in varying concentrations: 2-propenoic acid, 3,3-diphenylpropyl ester (DPHPA), m-phenoxybenzyl acrylate (POBA), (2-benzylphenyl) 2-methylprop-2-enoate (2-BzPA), dicyclopentenyl Acrylate (DCPA), and 1-naphthyl acrylate (1-NA). Furthermore, comparative photocurable compositions were prepared containing as di-functional acrylate monomer MXDA and as mono-functional monomer n-hexyl acrylate (nHA). All photocurable compositions further contained 2 wt % photoinitiator Irgacure 907, and 1 wt % of surfactant FS2000M1.

A summary of the used mono-functional monomers and its calculated ring parameter is shown in Table 1.

TABLE 1

| Mono-functional monomer | Ring Parameter |
|---|---|
| DPHPA | 0.54 |
| POBA | 0.57 |
| 2-BzPA | 0.605 |
| DCPA | 0.59 |
| 1-NA | 0.61 |
| nHA | 0 |

A summary of the tested photocurable compositions is shown in Table 2.

TABLE 2

| | S1 F128 | S2 I202 | S2 I203 | S3 I204 | S4 F136 | S5 F137 | S6 F138 | S7 F139 | S8 F140 | S9 F141 | S10 F142 | S11 F143 | S12 F144 |
|---|---|---|---|---|---|---|---|---|---|---|---|---|---|
| MXDA | 90 | 90 | 80 | 70 | 90 | 80 | 70 | 90 | 80 | 70 | 90 | 80 | 70 |
| DPHA | 10 | | | | | | | | | | | | |
| POBA | | 10 | 20 | 30 | | | | | | | | | |
| 2-BzPA | | | | | 10 | 20 | 30 | | | | | | |
| DCPA | | | | | | | | 10 | 20 | 30 | | | |
| 1-NA | | | | | | | | | | | 10 | 20 | 30 |
| Viscosity [mPa · s] | 13.7 | 12.4 | 14.3 | 16.6 | 12.6 | 13.5 | 14.6 | 11.5 | 12.1 | 12.0 | 12.9 | 13.9 | 15.2 |
| Carbon content [%] | 69.6 | 69.0 | 69.7 | 70.5 | 69.5 | 70.7 | 72.0 | 69.1 | 69.9 | 70.7 | 69.3 | 70.4 | 71.4 |
| Thermal Shrinkage [%] | 3.87 | 3.21 | 4.58 | 4.75 | 4.42 | 5.44 | 6.71 | 3.26 | 5.37 | 6.48 | 4.35 | 7.24 | 10.50 |

Preparing Photo-Cured Layer and Measuring the Thermal Shrinkage

Photo-cured layers were prepared from the photocurable compositions summarized in Table 2 by forming hand imprinted films having a thickness in the range of 3 to 5 microns. To make a hand-imprinted film, a few drops of the photocurable composition were placed onto a silicon wafer and allowed to spread across the wafer surface within the space confined by a quartz template. The template had no specific surface features such that plane films were obtained. The curing was conducted by applying UV light with a maximum wavelength of 365 nm at a light intensity of 20 mW/cm 2 for 120 seconds (corresponding to a radiation energy of 2.4 J/cm 2).

The photo-cured films were subjected to a high temperature baking treatment by placing the UV-cured film for two minutes on a hot plate having a temperature of 250° C. under nitrogen. The thickness of the film before and after the baking was measured with a JA Woollam Spectroscopic Ellipsometer M-2000 X-210. The thermal shrinkage (St) was calculated according to the equation: St=(Tu−Tb)/Tu, with Tu being the thickness of the photo-cured film before the baking, Tb being the thickness of the film after baking.

It can be seen in Table 2 that a low thermal shrinkage of not greater than 5% was obtained with photo-cured layers made from photocurable compositions containing 10 wt % of mono-functional monomer with a ring parameter greater than 0.5. When using POBA as mono-functional monomer, also with 20 wt % and 30 wt % POBA a thermal shrinkage below 5% was obtained.

Viscosities

The viscosities were measured at 23° C., using a Brookfield Viscometer LVDV-II+Pro at 200 rpm, with a spindle size #18. For the viscosity testing, about 6-7 mL of sample liquid was added into the sample chamber, enough to cover the spindle head. For all viscosity testing, at least three measurements were conducted and an average value was calculated.

Example 2

Investigation of Etch Resistance.

The etch resistance of photo-cured layers made from photocurable compositions S1 (90 wt % MXDA/10 wt % DPHPA) and S7 (90 wt % MXDA and 10 wt % DCPA), as described in Example 1, was compared with the etch resistance of the following comparative photo-cured layers: a) made from photocurable compositions with a polymerizable material containing 100 wt % MXDA (sample C1); b) a polymerizable material containing 90 wt % MXDA and 10 wt % nHA (sample C2); and c) a polymerizable material containing 80 wt % MXDA and 20 wt % nHA (sample C3). All other ingredients (photoinitiator and surfactant) of the comparative photocurable compositions were the same as for samples 51 and S7.

For testing the etch resistance 0.5 µl of the photocurable test composition was dropped on a silicon wafer, and a rigid blank fused silica mold was placed on top of the drop. The liquid was allowed to spread for about 5 minutes between the mold and the substrate to obtain a fully filled liquid thin layer. The liquid layer was cured through the mold by using a OAI UV lamp with an intensity of 17 mW/cm 2. After the curing, the mold was separated from the cured film. The thickness of the cured films was about 700 nm to 1.2 µm.

For measuring the etch resistance, dry etching under oxygen/argon atmosphere was conducted using a Trion Oracle 3-Chamber Cluster System as etch tool. The following etch conditions were applied: $O_2$: 2 sccm; Argon: 10 sccm; RF power: 45 Watt; pressure: 10 mTorr; etch time: 60 seconds; chuck temperature: 7° C., helium backside press: 5 Torr.

Table 3 summarizes the tested photocurable compositions and the measured etch rates.

TABLE 3

| | S1 | S7 | C1 | C2 | C3 |
|---|---|---|---|---|---|
| MXDA | 90 | 90 | 100 | 90 | 80 |
| DCPA | | 10 | | | |
| DPHA | 10 | | | | |
| nHA | | | | 10 | 20 |
| Etch rate [nm/min] | 50.5 | 51.9 | 67.4 | 74.9 | 77.4 |
| Carbon-content [%] | 69.6 | 69.1 | 68.3 | 68.4 | 68.5 |
| Viscosity [mPa · s] | 13.7 | 11.5 | 10.8 | 8.2 | 6.4 |

It can be seen that samples 51 and S7 were etched significantly slower than comparative samples C1, C2, and C3. The results demonstrate that the combination of multi-functional acrylate monomer and mono-functional monomer having a ring parameter of at least 0.5, as used in samples 51 and S7, was superior in the etch resistance after curing (resulting in a lower etch rate) in comparison to samples wherein the polymerizable material contained 100 wt % bi-functional acrylate monomer (sample C1), or being a combination of bi-functional acrylate monomer with a polymerizable monomer not having a ring parameter of at least 0.5 (samples C2 and C3).

Carbon Content

Tables 2 and 3 show for the listed photocurable compositions the calculated carbon content contained in the photo-cured layers after curing. For the carbon content calculations, it was assumed that the polymerizable material (reactive polymer and polymerizable monomers) amounts to 100% of the layer material, and the carbon content was calculated based on the calculated weight of all ingredients per mol, wherein "%" stands for the weight percent of the carbon of the layer material. The calculated carbon content should be very close to the actual carbon content, since there is no material loss, such as forming a gas or water during the curing.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A photocurable composition comprising a polymerizable material and a photoinitiator, wherein the polymerizable material comprises at least one multi-functional acrylate monomer in an amount of at least 75 wt % based on the total weight of the polymerizable material and at least one mono-functional monomer in an amount of at least 5 wt % and not greater than 12 wt % based on the total weight of the polymerizable material, the at least one mono-functional monomer having a ring parameter of at least 0.5;

the multi-functional acrylate monomer is m-xylylene diacrylate (MXDA);

the mono-functional monomer is selected from 2-propenoic acid, 3,3-diphenylpropyl ester (DPHPA), m-phenoxybenzyl acrylate (POBA), (2-benzylphenyl) 2-methylprop-2-enoate (2-BzPA), 1-naphthyl acrylate (1-NA) or any combination thereof; and a total carbon content of the photocurable composition after curing is at least 69%.

2. The photocurable composition of claim 1, wherein the amount of the at least one multi-functional acrylate monomer is at least 85 wt % based on the total weight of the polymerizable material.

3. The photocurable composition of claim 1, wherein an amount of the polymerizable material is at least 90 wt % based on the total weight of the photocurable composition.

4. The photocurable composition of claim 1, wherein the photocurable composition is adapted that a photo-cured layer formed from the photocurable composition has a thermal shrinkage after a baking treatment at 250° C. of not greater than 5.0%, the baking treatment including 2 minutes baking of the photo-cured layer on a stainless-steel plate having a temperature of 250° C. under $N_2$ environment.

5. The photocurable composition of claim 1, wherein a viscosity of the photocurable composition is not greater than 25 mPa·s at a temperature of 23° C.

6. The photocurable composition of claim 5, wherein a viscosity of the photocurable composition is not greater than 15 mPa·s.

7. The photocurable composition of claim 1, wherein the polymerizable material consists essentially of the multi-functional acrylate monomer and the mono-functional monomer.

8. The photocurable composition of claim 1, wherein the multi-functional acrylate monomer is a di-functional acrylate monomer in an amount of at least 85 wt % based on the total weight of the polymerizable monomer, and the mono-functional monomer is an aromatic acrylate monomer in an amount of at least 5 wt % based on the total weight of the polymerizable monomer.

9. A laminate comprising a substrate and a photo-cured layer, wherein the photo-cured layer is formed with the photocurable composition of claim 1.

10. The laminate of claim 9, wherein the photo-cured layer has a thermal shrinkage after a baking treatment at 250° C. of not greater than 5.0%, the baking treatment including 2 minutes baking of the photo-cured layer on a stainless-steel plate having a temperature of 250° C. under $N_2$ environment.

11. A method of forming a photo-cured layer on a substrate, comprising:

applying a layer of a photocurable composition on the substrate, wherein the photocurable composition comprises a polymerizable material and at least one photoinitiator, the polymerizable material comprising at least one multi-functional monomer in an amount of at least 75 wt % based on the total weight of the polymerizable material and at least one mono-functional monomer in an amount of at least 5 wt % and not greater than 12 wt % based on the total weight of the polymerizable material, the mono-functional monomer having a ring parameter of at least 0.5; the multi-functional acrylate monomer is m-xylylene diacrylate (MXDA); the mono-functional monomer is selected from 2-propenoic acid, 3,3-diphenylpropyl ester (DPHPA), m-phenoxybenzyl acrylate (POBA), (2-benzylphenyl) 2-methylprop-2-enoate (2-BzPA), 1-naphthyl acrylate (1-NA) or any combination thereof;

bringing the photocurable composition into contact with a template or a superstrate;

irradiating the photocurable composition with light to form a photo-cured layer; and removing the template or the superstrate from the photo-cured layer, wherein a total carbon content of the photo-cured layer is at least 69%.

12. The method of claim 11, wherein the photo-cured layer has a thermal shrinkage after a baking treatment at 250° C. of not greater than 5.0%, the baking treatment including 2 minutes baking of the photo-cured layer on a stainless steel plate having a temperature of 250° C. under $N_2$ environment.

13. The method of claim 11, wherein the photocurable composition has a viscosity of not greater than 25 mPa·s.

14. The method of claim 12, wherein the polymerizable material of the photocurable composition consists essentially of the multi-functional acrylate monomer and the mono-functional monomer.

15. A method of manufacturing an article, comprising:

applying a layer of a photocurable composition on a substrate, wherein the photocurable composition comprises a polymerizable material and at least one photoinitiator, the polymerizable material comprises at least one multi-functional acrylate monomer in an amount of at least 75 wt % based on the total weight of the polymerizable material and at least one mono-functional monomer in an amount of at least 5 wt % and not greater than 12 wt % based on the total weight of the polymerizable material, the mono-functional monomer having a ring parameter of at least 0.5; the multi-functional acrylate monomer is m-xylylene diacrylate (MXDA); the mono-functional acrylate monomer is selected from 2-propenoic acid, 3,3-diphenylpropyl ester (DPHPA), m-phenoxybenzyl acrylate (POBA), (2-benzylphenyl) 2-methylprop-2-enoate (2-BzPA), 1-naphthyl acrylate (1-NA) or any combination thereof;

bringing the photocurable composition into contact with a template or a superstrate;

irradiating the photocurable composition with light to form a photo-cured layer;

removing the template or the superstrate from the photo-cured layer;

forming a pattern on the substrate;

processing the substrate on which the pattern has been formed in the forming; and manufacturing an article from the substrate processed in the processing, wherein a total carbon content of the photo-cured layer is at least 69%.

* * * * *